(12) United States Patent
Bertozzini

(10) Patent No.: US 12,402,751 B2
(45) Date of Patent: Sep. 2, 2025

(54) CONTAINER FOR COOKING FOODS COMPRISING A NON-STICK COATING

(71) Applicant: TVS S.p.A., Fermignano (IT)

(72) Inventor: Giuseppe Alberto Bertozzini, Fermignano (IT)

(73) Assignee: TVS S.P.A., Fermignano (IT)

( * ) Notice: Subject to any disclaimer, the term of this patent is extended or adjusted under 35 U.S.C. 154(b) by 102 days.

(21) Appl. No.: 17/798,256

(22) PCT Filed: Feb. 8, 2021

(86) PCT No.: PCT/IB2021/050985
§ 371 (c)(1),
(2) Date: Aug. 8, 2022

(87) PCT Pub. No.: WO2021/156834
PCT Pub. Date: Aug. 12, 2021

(65) Prior Publication Data
US 2023/0072980 A1    Mar. 9, 2023

(30) Foreign Application Priority Data
Feb. 7, 2020 (IT) .................. 102020000002431

(51) Int. Cl.
*A47J 36/02* (2006.01)
(52) U.S. Cl.
CPC .................. *A47J 36/025* (2013.01)
(58) Field of Classification Search
CPC ........ A47J 27/002; A47J 36/02; A47J 36/025; A47J 36/04
See application file for complete search history.

(56) References Cited

U.S. PATENT DOCUMENTS

| 10,292,528 B2 * | 5/2019 | Perillon ................. A47J 36/025 |
| 2011/0192850 A1 * | 8/2011 | Le Bris ................. A47J 36/025 220/573.2 |

(Continued)

FOREIGN PATENT DOCUMENTS

| CN | 105768852 A | 7/2016 | |
| DE | 202011100029 U1 * | 9/2012 | ............ A47J 36/025 |

(Continued)

OTHER PUBLICATIONS

International Search Report for PCT/IB2021/050985 dated May 4, 2021 (4 pages).

*Primary Examiner* — Shawn M Braden
(74) *Attorney, Agent, or Firm* — Tutunjian & Bitetto, P.C.

(57) ABSTRACT

A container for cooking food including a body, a bottom and a side wall, said body having an external surface, designated to come into contact with a heat source, and an internal surface, designated to come into contact with food. The internal surface includes a non-stick coating, having an overall thickness of at least 15 μm, for example a thickness between 15 μm and 80 μm, and sintered through a single firing, at a temperature between 380° C. and 450° C. for fluoropolymer based non-stick products (e.g. PTFE) and between 150° C.-350° C. for Sol-Gel based non-stick products (e.g. ceramic). The container further includes at least one decoration applied under the coating; this decoration has, thanks to the high thickness of the non-stick coating placed above it, greater resistance to abrasion and scratches as well as greater resistance to washing in the dishwasher; the coating is transparent or semi-transparent.

7 Claims, 1 Drawing Sheet

(56) References Cited

U.S. PATENT DOCUMENTS

2016/0309955 A1    10/2016  Funayama
2017/0245677 A1*    8/2017  Cheng .................. A47J 27/002

FOREIGN PATENT DOCUMENTS

| EP | 0188958 | B1 |   | 7/1989 |            |
|----|---------|----|---|--------|------------|
| EP | 1121576 | B1 |   | 5/2008 |            |
| EP | 2412846 | A1 | * | 2/2012 | A47J 36/02 |
| FR | 2784459 | A1 |   | 4/2000 |            |
| FR | 2915205 | A1 |   | 10/2008 |           |
| WO | 2005094645 | A1 |   | 10/2005 |        |
| WO | 2016005694 | A1 |   | 1/2016 |         |
| WO | 2017011250 | A1 |   | 1/2017 |         |

\* cited by examiner

CONTAINER FOR COOKING FOODS COMPRISING A NON-STICK COATING

TECHNICAL FIELD OF THE INVENTION

The present invention refers to a container for cooking or in any case receiving food, for example pans, pots, saucepans, frying pans, woks, grills, glass containers and the like with a non-stick internal coating.

The present invention also refers to the method for making the afore mentioned container for cooking or in any case receiving food.

STATE OF THE PRIOR ART

In the field of containers for cooking or receiving food, such as pots, pans, pans, woks, grills, oven dishes, backing pans, cake pans and the like, types of containers for cooking or receiving food provided with a non-stick coating are known.

Non-stick containers for cooking food are generally internally coated with a layer of material PTFE-based (short for polytetrafluoro-ethylene fluoropolymer) or "ceramic"-based (Sol-Gel process) which allows the food not to stick.

The two types of non-stick coatings have excellent characteristics such as slipperiness, ease of cleaning, high chemical resistance and thermal resistance, for example 260° C. continuously for the PTFE coating and about 400° C. for the ceramic coating.

As regards the process for making the non-stick coating on the container, this process includes an initial phase for preparing the substrate with cleaning (degreasing) and sandblasting operations, which ensure an improved constrain of the coating and greater resistance to corrosion.

Subsequently, the non-stick material is applied, usually including several layers, until a thickness is reached that provides maximum performance, not only in terms of wear and scratch resistance but also of durability.

The durability and performance of the non-stick coating essentially depend on the thickness and number of overlapping coating layers.

The non-stick coating layers, based on PTFE, can be divided into:
1) base layer or primer: paint layer fundamental for adhesion to the metal support;
2) intermediate layer or midcoat (optional): paint layer used to reinforce the coating and with the function of interface between the primer and the finishing layer;
3) finishing layer or topcoat: layer of paint applied directly on the primer, in the case of a two-layer coating, or on the intermediate layer, in the case of a three-layer coating, which gives the coating with effective non-stickiness. Therefore, the finishing layer is that with the highest percentage of fluoropolymers.

These layers can be applied by spray, roller, veil, dipping, pad printing, silk-screen printing or other method of application, both when they are in the wet phase and when they are completely dried.

Generally, the first layer is dried for such a time as to bring it into the so-called "dry-to-touch" state, i.e. when no mark or imprint remains on its surface if the layer is touched with a finger, while the intermediate and the finishing layers can be dried or not dried; then, all the layers are fired in an oven at about 430° C. for final sintering.

The so-called "ceramic" coating is instead based on Sol-Gel technology, and the name comes from the inorganic particles of ceramic oxides contained therein. The particular technique creates on the substrate a compact, smooth, absolutely non-porous and shiny coating film (glassy appearance) which guarantees crisp cooking, ease of cleaning and a completely new experience compared to traditional PTFE-based non-stick products.

The ceramic-based non-stick coating layers can be divided into:
1) base layer or basecoat: paint layer fundamental for adhesion to the metal support;
2) finishing layer or topcoat: layer of paint applied directly on the basecoat, which gives the coating an effective non-stickiness.

As the components of the layers are catalysed, it is not possible to wait too long between the application of the base and the finishing, otherwise the adhesion of the two layers is not obtained.

These layers can be applied by spray, roller, veil, dipping, pad printing, silk-screen printing or other method of application, both when they are in the wet phase and when they are partially dried.

The basecoat layer and the finishing can be dried, or not dried, and then all the layers are subjected to the firing in oven, at temperatures generally between 200° and 350° C.

Direct drying in air is also possible, since the products are catalysed.

Non-stick coatings can be decorated, by means of pad printing, silk-screen printing or other method of application.

Containers for cooking food are known in the market, which are characterized in that they have a decoration, applied on a non-stick coating layer PTFE-based or PFA-based or FEP-based or a mixture of the aforementioned polymers, as described in the European patent EP 0188958 B1.

The afore-mentioned decoration can also include two patterns: the first characterized by a pattern based on iron oxides, which darkens reversibly with increasing temperature; the second, based on red organic pigment, which reversibly lightens with increasing temperature, as described in European patent EP 1121576 B1.

The decoration can also be applied on a Sol-Gel ceramic layer, as shown in US patent U.S. Pat. No. 10,292,528 B2.

The aforementioned decoration can also be protected with a further non stick finishing layer but with coating thicknesses, above the decoration, less than 15 μm.

However, these types of decorations, being applied over a non-stick PTFE or ceramic coating, have compatibility problems with the already non stick substrate, and are subject to possible scratches and abrasions, caused by external agents or washing in the dishwasher, and consequently they can have an durability over time not appropriate.

The application of the decoration on the non-stick requires a drying or cooking phase of the non-stick, which involves a slower and more expensive process.

Today, the market requires food containers with safer, cheaper non-stick coatings, and with decorations that are more durable over time, and also resistant to washing in the dishwasher.

SUMMARY OF THE INVENTION

The technical task of the present invention is therefore to improve and simplify the state of the prior art in the field of containers for cooking or receiving foods with a non-stick coating.

Within the scope of this technical task, it is an object of the present invention to develop a container for cooking food, and the related manufacturing method, which allows to overcome the previously mentioned drawbacks.

Another object of the present invention is to make available a container for cooking food with a non-stick coating whose internal decoration is more durable over time, and therefore characterized by better resistance to abrasion, scratching, washing in the dishwasher.

A further object of the present invention is to provide a container for cooking food with a non-stick coating and decoration capable of varying its color with respect to the temperature.

Another object of the present invention is to provide, with a single baking in the oven, a non-stick coating provided with an internal decoration which is durable over time and more economical.

A further purpose of the invention is to simplify and make the method of decorating a non-stick coating more economical.

According to an aspect of the present invention, a container for cooking food with a non-stick coating according to the present application is provided.

Furthermore, a method for making a non-stick container for cooking food according to the present application is provided.

According to an aspect of the invention, the decoration provided in the container is protected by a high thickness, transparent or semi-transparent non stick coating, which does not cover the decoration itself, based on PTFE/PFA/FEP/PES/PEEK or a mixture of polymers or Sol-Gel base (ceramic).

The decoration can be thermochromic, and is applied under the non-stick, transparent or semi-transparent coating, and therefore it has a better resistance to abrasion, scratching, washing in the dishwasher and is more durable over time than the decorations used by the state of the prior art.

In one embodiment of the invention, the non-stick coating is based on PTFE/FEP/PFA/PES/PEEK or a mixture of polymers or Sol-Gel, and contains Aloe powder, juice or gel.

Aloe is known for its anti-inflammatory, moisturizing properties and for its antibacterial and antiviral action.

Some studies have shown that Aloe extracts are able to act against certain types of bacteria, viruses or fungi including *Escherichia coli* and *Candida albicans*.

The use of this plant has a long tradition in different parts of the world given the many benefits that have been found over the years, now also confirmed by some scientific research.

According to another aspect of the invention, the manufacturing method of the container involves applying a decoration, with silk-screen printing or pad printing or other method of application, directly on the metal surface of the food container, before applying any type of non-stick coating.

The decoration on a metal surface is much simpler and more precise/clear than that applied to a metal surface already coated with non-stick.

The aforementioned method is simple and cheap as it does not require passivating or baking the non-stick coating layer before applying the decoration with silk-screen or pad printing ink.

The present application refers to preferred and advantageous forms of the invention.

BRIEF DESCRIPTION OF THE DRAWINGS

Other features and advantages of the invention will be more evident from the description of an embodiment of a unit, illustrated by way of example in the accompanying drawings in which.

In the accompanying drawings, identical parts or components are indicated by the same reference numbers.

DETAILED DESCRIPTION OF THE INVENTION

Figure 1:
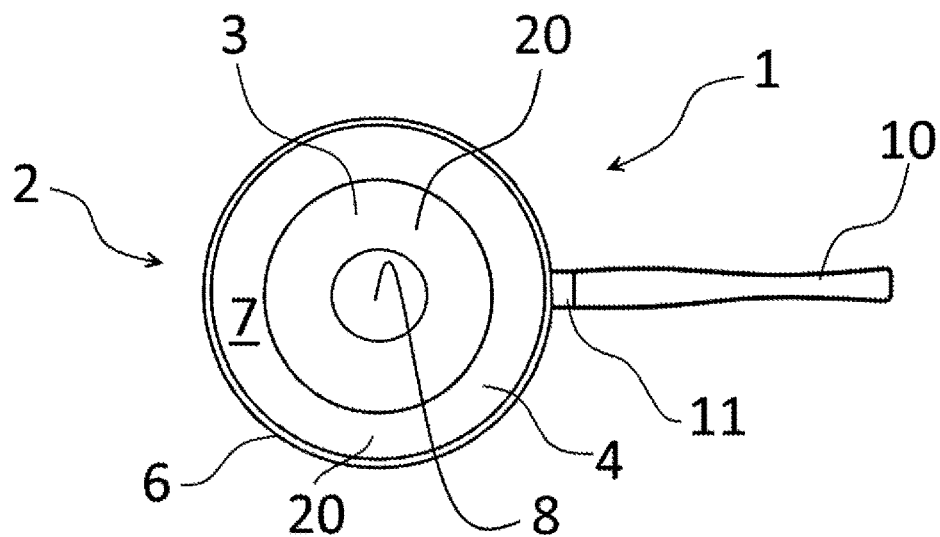
FIG. 1 is a top view of a container for cooking or receiving food according to the present invention.

With reference to FIG. 1, the number 1 generally indicates a container for cooking food according to the present invention.

Figure 2:
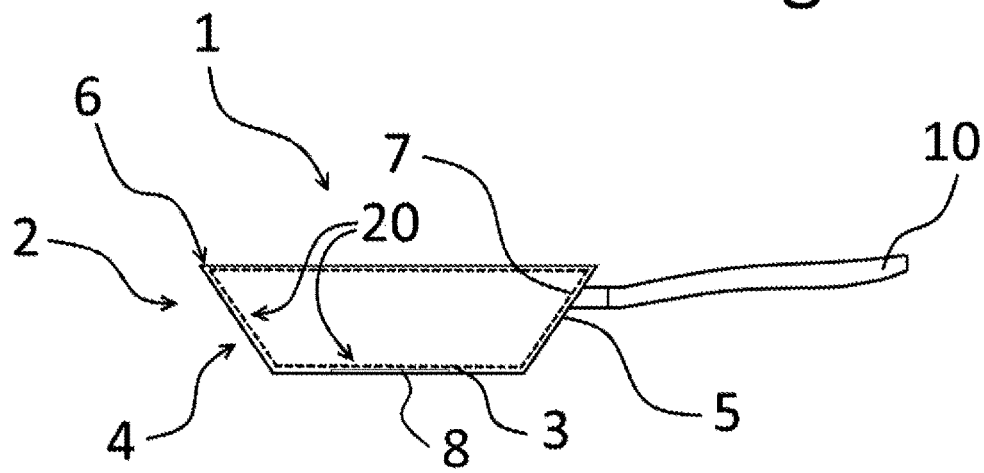
FIG. 2 is a side view of the container of FIG. 1.

In particular, FIGS. 1 and 2 schematically show a container for cooking or receiving food which is made, by way of non-limiting example only, in the form of a pan.

It should be noted that the container 1 can be of any other type, for example it can consist of a pot, a saucepan, a grill pan, or other, without any limitation.

The container 1 comprises, in a known way, a substantially bowl-shaped or substantially flat body 2, comprising a bottom 3 and a side wall 4. In detail, the body 2 defines an external surface 5, an upper edge 6 and an internal surface 7.

The body 2 and its upper edge 6 can have any shape, for example rectangular, oval, circular, or other.

The container 1 also comprises a handle or grip 10, made of any type of material, which has an end 11 for fixing to the body 2 of the container 1.

The handle or grip 10 can be fixed to the body 2 by welding, for example by means of a goujon, or by riveting, or with other equivalent connection techniques.

The body 2 of the container 1 is made for example of metallic material, such as aluminium alloy, stainless steel, or other metal or other metal alloy; the body 2 can however be made of any other material with physical and mechanical characteristics suitable for allowing the cooking or in any case the preservation of food, such as porcelain, wood, plastic, terracotta, glass, composite materials, etc.

According to a particularly advantageous exemplary and non-limiting form of the present invention, the body 2 of the container 1 is made of borosilicate glass. This material, preferably composed of silica, sodium carbonate, alumina and boron mixed together, has excellent resistance to mechanical shocks, excellent resistance to thermal shocks up to about 220° C. and low expansion coefficients. For these reasons, the construction of the body 2 in borosilicate glass allows the container 1 to be used both for cooking food in the oven, for cooking food in the microwave, and for hot and cold storage, for example in the refrigerator or freezer, of food.

The body 2 is formed, according to methods which are not the subject of the present invention, assuming the desired final shape; then the body 2 is surface treated by means of a polishing and/or brushing and/or sandblasting and/or anodizing and/or painting and/or grinding process, to allow better adhesion of the non-stick coating 20 which will subsequently be applied to the aforementioned body 2.

On the external surface 5 of the container 1, at least one layer of protective paint can be applied which can be sol-gel ceramic-based, PTFE-based, or a lacquer or porcelain enamel, or still another type of paint suitable for resisting temperatures of heat sources for cooking food.

The applicant has developed an innovative article with decoration 8, thermochromic or not thermochromic, applied directly on the internal surface of the body 2, under the non-stick coating 20.

The decoration 8 is applied to the internal surface 7 of the body 2 with a screen printing, pad printing, spray, roller, brush or still another method of application.

Figure 3:
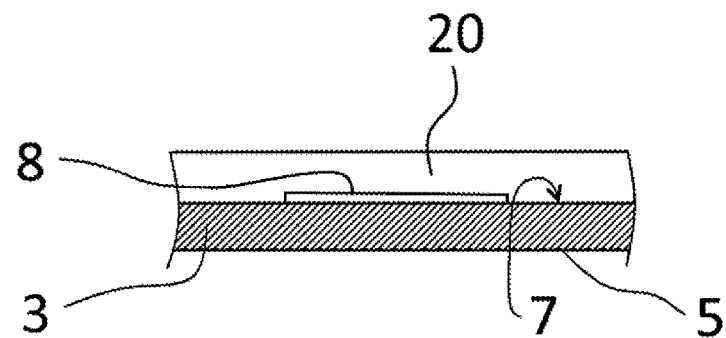
FIG. 3 is a detail of a cross section of the container of FIGS. 1 and 2.

FIG. 3 schematically shows a sectional detail of the body 2 of the container 1, with the internal surface 7 on which a decoration 8 is applied, with one or more patterns, thermochromic or not thermochromic, and subsequently the non-stick coating 20.

The non-stick coating 20 is transparent or semi-transparent so as not to visually cover the decoration 8, and can be based on PTFE/PFA/FEP/PES/PEEK or a mixture of polymers or based on Sol-Gel (ceramic).

The non-stick coating 20 can have, for example, a thickness of between 15 μm and 80 μm.

Furthermore, in a preferred embodiment of the present invention, the non stick coating 20 can contain Aloe powder, juice or gel.

The non-stick coating 20 comprises at least a base layer and an intermediate layer (not shown in the figures) made of non-stick material, which respectively have a thickness that can be, for example, between 7 μm and 20 μm and between 8 μm and 20 μm.

The intermediate layer can be optional; above the intermediate layer-if provided—there is at least one finishing layer (not shown in the figures), with which the food comes into contact. This layer may have, by way of non-limiting example, a thickness between 20 μm and 40 μm.

It should be noted that, subsequently, all the layers of the non-stick coating 20 (PTFE or Sol-Gel) are subjected to firing in oven for the final sintering by means of a single firing, without producing surface defects, such as surface breaks, cracks, drips and various irregularities.

Firing takes place at a temperature between 380° C. and 450° C. for fluoropolymer based non-stick products (e.g. PTFE), and between 150° C.-350° C. for Sol-Gel based non-stick products (ceramic example).

The decoration 8, with one or more patterns, thermochromic or not, is applied under the non-stick coating 20 and therefore is more durable over time, resistant to abrasion and scratches and resistant to washing in the dishwasher than the other internal decorations present in the market.

Furthermore, its application, occurring directly on the metal surface of the body 2, is very precise and easy to perform.

In the event that the decoration 8 is thermochromic, it can be used by the user to obtain information relating to the degree of heating of the container, for example an intense dark red decoration would indicate a high temperature of the container.

The thermochromic decoration can also have two patterns, with one color that darkens and the other that lightens slightly while increasing temperature.

The method for manufacturing the above-mentioned container 1 for cooking food is illustrated below, method which is also the subject-matter of the present invention.

The method initially involves a step of making the body 2 in metal material, for example aluminium alloy, stainless steel, or other metal or other metal alloy and/or in any other material with chemical-physical and mechanical characteristics to allow cooking or in any case the preservation of food, for example materials such as porcelain, wood, plastic, terracotta, glass, for example borosilicate glass, composite materials, etc.

Subsequently, one proceeds with the step of forming the body 2, so that it assumes the desired final shape.

At a later stage, a step is envisaged of treating the surface of the body 2 by means of a polishing and/or brushing and/or sandblasting and/or anodizing and/or painting and/or grinding process, to allow a better adhesion of the non-stick coating 20 on said body 2.

The method then proceeds with the application of a decoration 8 on the internal surface 7.

Finally, the non-stick coating 20, which has a high thickness, according to the above-described specifications, is applied on the internal surface 7, and consequently also on the decoration 8.

Thanks to the thickness of the non-stick coating 20, applied above said decoration 8, the latter will have greater resistance to abrasion and scratches, as well as greater resistance to washing in the dishwasher.

In another embodiment of the invention, the method comprises, in addition to the steps described above, or even only some of them, at least one passivation and/or drying step of the container 1, by means of thermal, physical, chemical treatment, or according to a combination thereof.

In yet another embodiment of the invention, the method comprises, in addition to the steps described above, or even only some of them, at least one step for fixing handles, grips 10 and the like, by welding, for example by a goujon, or by riveting, or with other equivalent connection techniques.

It has thus been seen how the invention fully achieves the proposed objects.

The container according to the present invention, thanks to the application of the decoration directly on the metal surface of the body and under the transparent or semi-transparent non-stick coating, is able to significantly increase the resistance of said decoration to possible scratches and abrasions deriving from external agents, such as for example possible scratches caused by hand washing the container, or by continuous washing in the dishwasher.

Furthermore, the application of the decoration, being carried out directly on the metal surface of the body 2, is very precise and easy to perform and cheaper than a decoration applied directly on a non-stick coating.

According to the exemplary and non-limiting embodiment of the invention in which the container 1 comprises a body 2 made of borosilicate glass and a transparent or semi-transparent non-stick coating applied over a decoration, if desired thermochromic, it is possible to obtain a container for food with great resistance to mechanical and thermal shocks, thereby allowing a longer duration in time even of the decoration itself. The non-stick coating allows, in addition to facilitating the washing of the container, preventing the food being cooked from sticking to it, also a healthier kitchen, making it possible to eliminate or otherwise reduce oils and fats.

The invention thus conceived is susceptible of numerous modifications and variations, all of which fall within the scope of the following claims.

The invention claimed is:

1. A container for cooking or receiving foods comprising a body, a bottom and a lateral wall, said body having an outer surface, designated to come into contact with a heat source, and an inner surface, designated to come into contact with the food, said inner surface comprising a non-stick coating, said non-stick coating having an overall thickness of at least 15 μm, and being sintered by means of a single cooking, at a temperature comprised between 380° C. to 450° C. for fluoropolymer-based anti-stick coatings and between 150° C. and 350° C. for Sol-Gel-based anti-stick coatings, further comprising at least one decoration applied beneath said coating, and directly on the surface of said body, said at least one decoration having, due to a high thickness of the non-stick coating placed above it, resistance to abrasion and scratch, as well as resistance to washing in a dishwasher, said coating being transparent or semi-transparent, wherein said decoration is a thermochromic silkscreen decoration or a thermochromic pad printing decoration.

2. The container according to claim 1, wherein said decoration comprises one or more patterns, and can be thermochromic or non-thermochromic.

3. The container according to claim 1, wherein said non-stick coating is applied to said inner surface by spraying, rolling, curtain coater machine, silk-screen printing, pad printing, paintbrush or other equivalent method of application.

4. The container according to claim 3, wherein said non-stick coating is based on PTFE/PFA/FEP/PES/PEEK or mixture of polymers.

5. The container according to claim 3, wherein said non-stick coating is based on Sol-Gel.

6. The container according to claim 4, wherein said non-stick coating contains Aloe powder, juice or gel and/or any Aloe-based compound.

7. The container according to claim 1, wherein said body is made of borosilicate glass.

* * * * *